(12) United States Patent
Brule et al.

(10) Patent No.: US 12,384,894 B2
(45) Date of Patent: *Aug. 12, 2025

(54) METHOD FOR IMPREGNATING REINFORCING FIBRES WITH POLYARYLETHERKETONES AND SEMI-PRODUCTS OBTAINED THEREFROM

(71) Applicant: ARKEMA FRANCE, Colombes (FR)

(72) Inventors: Benoît Brule, Serquigny (FR); Henri-Alexandre Cayzac, Bernay (FR); Guillaume Le, Serquigny (FR); Jerome Pascal, Grandchain (FR); Fabien Sguerra, Saint Laurent du Var (FR)

(73) Assignee: ARKEMA FRANCE, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,904

(22) Filed: May 23, 2023

(65) Prior Publication Data
US 2023/0374237 A1    Nov. 23, 2023

Related U.S. Application Data

(63) Continuation of application No. 16/500,160, filed as application No. PCT/FR2018/050856 on Apr. 5, 2018, now Pat. No. 11,697,718.

(30) Foreign Application Priority Data

Apr. 5, 2017  (FR) ...................................... 1752951

(51) Int. Cl.
C08J 5/24          (2006.01)

(52) U.S. Cl.
CPC ........... *C08J 5/249* (2021.05); *C08J 2300/22* (2013.01); *C08J 2329/10* (2013.01); *C08J 2329/12* (2013.01); *C08J 2361/18* (2013.01)

(58) Field of Classification Search
CPC .... C08J 5/249; C08J 2300/22; C08J 2329/10; C08J 2329/12; C08J 2361/18
USPC ....................................................... 523/207
See application file for complete search history.

(56) References Cited

U.S. PATENT DOCUMENTS

| | | |
|---|---|---|
| 4,894,105 A | 1/1990 | Dyksterhouse et al. |
| 5,063,265 A | 11/1991 | Harris |
| 5,236,972 A | 8/1993 | Reinhart |
| 5,888,580 A | 3/1999 | Hinrichsen et al. |
| 2016/0333190 A1* | 11/2016 | Brule ............... C08K 3/22 |
| 2018/0119333 A1 | 5/2018 | Krzeminski et al. |
| 2018/0201759 A1 | 7/2018 | Le et al. |

FOREIGN PATENT DOCUMENTS

| | | | |
|---|---|---|---|
| EP | 0272648 A2 | 6/1988 | |
| EP | 0344327 A1 | 12/1989 | |
| FR | 3034425 A1 | 10/2016 | |
| JP | S62115033 A | 5/1987 | |
| JP | H02175972 A | 7/1990 | |
| JP | H05345829 A | 12/1993 | |
| JP | H1079235 A | 3/1998 | |
| JP | 2000344972 A | 12/2000 | |
| JP | 2017531726 A | 10/2017 | |
| JP | 2018520258 A | 7/2018 | |
| WO | 8803468 A2 | 5/1988 | |
| WO | WO-2015092272 A1 * | 6/2015 | .......... B29C 64/153 |
| WO | 2016062558 A1 | 4/2016 | |
| WO | 2016156325 A1 | 10/2016 | |
| WO | 2017013368 A1 | 1/2017 | |
| WO | 2017013369 A1 | 1/2017 | |

OTHER PUBLICATIONS

Chen et al., "Pharmaceutics, Xi'an Jiaotong University Press", Jan. 31, 2014, pp. 207-209.
International Search Report (PCT/ISA/210) mailed on Jun. 1, 2018, by the European Patent Office as the International Searching Authority for International Application No. PCT/FR2018/050856.
Office Action (Notice of Grounds for Rejection) issued on Aug. 24, 2022, by the Intellectual Property Office in corresponding Korean Patent Application No. 10-2019-7031725, and an English Translation of the Office Action. (12 pages).
Written Opinion (PCT/ISA/237) mailed on Jun. 1, 2018, by the European Patent Office as the International Searching Authority for International Application No. PCT/FR2018/050856.
Office Action (The Second Office Action) issued on Feb. 23, 2022, by the State Intellectual Property Office of the People's Republic of China in corresponding Chinese Patent Application No. 201880022976.5.
2019-554911, "Office Action (Notice of Reasons for Rejection)", 19 pages, Feb. 28, 2022.
Opposition filed by Toray Advanced Composite in European Patent No. 3 606 984 B1 on Sep. 28, 2023, 25 pages.
D1 from Toray Opposition—"Wet impregnation as route to unidirectional carbon fibre reinforced thermoplastic composites manufacturing" in Plastics Rubber and Composites, 2011, vol. 40, No. 2, published Mar. 2011.

(Continued)

Primary Examiner — David T Karst
(74) Attorney, Agent, or Firm — Boone IP Law

(57) ABSTRACT

A process for the preparation of a semifinished product including a PAEK-based resin and reinforcing fibers, including the stages of: a. preparation of a dispersion including a PAEK-based resin in the pulverulent form dispersed in an aqueous phase including a surfactant; b. bringing the reinforcing fibers into contact with said aqueous dispersion; c. drying the fibers impregnated with dispersion; and d. heating the impregnated fibers to a temperature sufficient for the melting of the resin, so as to form a semifinished product, wherein the surfactant is a thermally stable surfactant. Also, semifinished products capable of being obtained from the process and their use in the manufacture of composite materials.

16 Claims, No Drawings

(56) References Cited

OTHER PUBLICATIONS

D2 from Toray Opposition—Experimental report regarding thermal stable surfactant Aerosol OT 75 E disclosed in D1., Sep. 27, 2023.
Opposition filed by Victrex Manufacturing Ltd. in European Patent No. 3 606 984 B1 on Sep. 26, 2023, 25 pages.
D6 from Victrex Opposition—Kepstan PEKK Brochure, copyright date 2018.
D7 from Victrex Opposition—Experimental Evidence generated by Victrex , Apr. 10, 2023.
Third Party Observation filed by Victrex Manufacturing Ltd. in European Application No. 22212331.7 on Apr. 22, 2024, 3 pages.
Third Party Observation filed by Anonymous in European Application No. 18718898.2 on May 7, 2024, 6 pages.
Response to Oppositions in European Patent No. 3 606 984 B1 on Feb. 22, 2024, 21 pages.

\* cited by examiner

METHOD FOR IMPREGNATING REINFORCING FIBRES WITH POLYARYLETHERKETONES AND SEMI-PRODUCTS OBTAINED THEREFROM

CROSS REFERENCE TO RELATED APPLICATIONS

The present application is a continuation of U.S. application Ser. No. 16/500,160, filed on Oct. 2, 2019, which is a U.S. national stage of International Application No. PCT/FR2018/050856, filed on Apr. 5, 2018, which claims the benefit of French Application No. 1752951, filed on Apr. 5, 2017. The entire contents of each of U.S. application Ser. No. 16/500,160, International Application No. PCT/FR2018/050856, and French Application No. 1752951 are hereby incorporated herein by reference in their entirety.

TECHNICAL FIELD

The present patent application relates to the field of the manufacture of semifinished products comprising a thermoplastic matrix and reinforcing fibers. It also relates to such semifinished products and to their use in the manufacture of composite parts.

Known Art

The composite materials combining a thermoplastic resin with reinforcing fibers are, due to their excellent mechanical properties for a low weight, of great interest in numerous fields, in particular in the aeronautical and space industry, but also in the motor vehicle industry and the sports equipment industry.

These composite materials are generally manufactured by consolidation of semifinished products consisting of resin-coated reinforcing fibers, such as prepregs in the form of unidirectional sheets, of rovings or of wovens.

These semifinished products can be obtained by impregnation of the fibers by the resin. There exist different impregnation processes, in which the resin can be molten, dissolved in a solvent, or else in the powder form, either in a fluidized bed or dispersed in an aqueous solution. The impregnated fibers are subsequently, if appropriate, freed of the solvent or of the aqueous solution and then heated in order to melt the retained resin and to form the semifinished product.

The impregnation in a bath of aqueous dispersion is advantageous economically and environmentally. Nevertheless, this process requires, in order to obtain a uniform loading of the fibers with resin, that a homogeneous distribution of the resin in the dispersion be provided.

Thus, the patent application WO 88/03468 provides for stabilizing the suspension by rendering it highly viscous (at least 50 Pas) and by additionally adding, if appropriate, a surfactant.

With a similar approach, the patent U.S. Pat. No. 5,236,972 provides for the addition, to the dispersion, of a water-soluble polymer, a wetting agent and, in addition, a biocide, a plasticizer and an anti-foaming agent.

The patent U.S. Pat. No. 5,888,580 provides for the use, on the contrary, of a dispersion having a low viscosity and containing little dispersing agent, and for the regulation of the loading of the fibers with resin via the concentration of resin in the dispersion and the residence time. However, the composite parts manufactured from such semifinished products exhibit a high porosity and nonoptimal mechanical properties.

In order to overcome this problem, the application FR 3 034 425 provides for the dispersing of the thermoplastic resin by means of a specific alkoxylated alcohol surfactant, namely 100-times ethoxylated stearyl alcohol, and for the combining of a stirring device in order to keep the suspension homogeneous. Thus, the authors claim to be able to consolidate composite products without porosities. Nevertheless, it is found that the addition of such a surfactant brings about an increase in the viscosity of the resin, in particular in polymers having a high melting point, such as PAEKs. A high viscosity of the resin can result in subsequent forming defects. This is because, in the molten state, the excessively viscous polymeric resin is no longer capable of flowing suitably. For this reason, it is difficult to achieve composite parts having the desired shape and the desired surface appearance.

In particular, it is common to observe the appearance of surface creasings and problems of strength of the welds produced during the assembling of the composite parts into complex parts. These defects are exacerbated when the consolidation is carried out at a pressure of less than 5 bar.

Generally, it is advantageous to be able to manufacture composite parts without resorting to a high pressure, since this requires the use of very expensive autoclaves.

The aim of the invention is to overcome these problems and to provide a process for the preparation of semifinished products capable of being converted into composite parts not exhibiting the abovementioned defects.

Another aim of the invention is to provide a process for the preparation of semifinished products capable of being consolidated under low negative pressure, outside an autoclave.

More specifically, it is an aim of the invention to provide such a process for the preparation of semifinished products in which the resin exhibits a viscosity and a molecular weight which change little subsequent to the thermal cycles required in the manufacture of composite parts.

SUMMARY

The abovementioned aims were achieved by a process according to the invention, in which the reinforcing fibers are impregnated in an aqueous dispersion of pulverulent resin comprising at least one thermally stable surfactant.

This is because the present invention is based on the observation that the quality of the composite parts based on PAEK resins depends in particular on the viscosity of the resin in the semifinished product and on its subsequent evolution. In point of fact, the high temperatures necessary for the manufacture and the consolidation of PAEK-based semifinished products (temperatures generally of greater than 300'C) can bring about the decomposition of compounds introduced during the manufacture to give reactive entities, which can result in chain elongation reactions of the PAEKs which can lead to branchings. The increase in the molecular weight which results therefrom then increases the viscosity of the resin.

In point of fact, the systematic study of the different agents liable to be present in the PAEK-based semifinished product revealed, on the one hand, that the surfactant used in the dispersion constituted a main factor in the increase in the viscosity after a thermal cycle and, on the other hand, that this effect was very variable according to the surfactant chosen.

On this basis, it could be validated that the use of a thermally stable surfactant makes it possible to limit the change in the viscosity of the resin and to obtain composite parts of required quality.

Without wishing to be committed to this hypothesis, it is assumed that many surfactants decompose in the PAEK resin under the effect of the high temperature required for its conversion. The reactive entities formed during the decomposition, in particular the radicals, may then react with the polymer and bring about chain elongation reactions or branchings, which increase the molecular weight of the polymer and, for this reason, also its viscosity. In point of fact, when the resin exhibits a high viscosity, it is no longer able to thoroughly impregnate and to coat the fibers, to ensure good adhesion of the semifinished products together, nor to match the mold walls, which affects the quality of the composite products obtained.

Consequently, according to a first aspect, a subject matter of the invention is a process for the preparation of a semifinished product comprising a PAEK-based resin and reinforcing fibers, comprising the stages of:
a. preparation of a dispersion comprising a PAEK-based resin in the pulverulent form dispersed in an aqueous phase comprising at least one surfactant;
b. bringing the reinforcing fibers into contact with said aqueous dispersion in order to obtain impregnated fibers;
c. drying the fibers impregnated with dispersion; and
d. heating the impregnated fibers to a temperature sufficient for the melting of the resin, so as to form a semifinished product, characterized in that the surfactant is a thermally stable surfactant.

Advantageously, the thermally stable surfactant comprises aromatic groups. According to another embodiment of the invention, the surfactant comprises a phosphoric acid, phosphate or sulfonate group. Preferably, it is a question of ionic groups.

Preferably, the reinforcing fibers are carbon fibers. Preferably, the reinforcing fibers employed in the process of the invention are nonsized fibers.

When the reinforcing fibers are sized fibers, they are preferably sized with a thermally stable size.

Preferably, the PAEK resin is chosen from the group consisting of poly(ether ketone) (PEK), poly(ether ether ketone) (PEEK), poly(ether ether ketone ketone) (PEEKK), poly(ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), their mixtures and their copolymers with one another or with other members of the family of the PAEKs.

When it is a question of a PEKK resin, the PAEK resin is preferably a PEKK exhibiting a percentage by weight of terephthalic units, with respect to the sum of the terephthalic and isophthalic units, of between 35% and 100%, in particular between 50% and 90% and very particularly between 55% and 85%.

Advantageously, the pulverulent PAEK resin in the dispersion exhibits a volume median diameter Dv50 of 1 to 300 μm, preferably of 5 to 100 μm and very particularly of 10 to 50 μm, as measured according to the standard ISO 13 320, on an Insitec device from Malvern.

According to a preferred embodiment, the semifinished product is chosen from a prepreg or a tape.

Furthermore, according to a second aspect, a subject matter of the invention is a semifinished product capable of being obtained by said process.

Preferably, the weight-average molecular weight $M_w$ of the PAEK resin in the semifinished product, as measured by size exclusion chromatographic analysis, does not increase by more than 100%, in particular not more than 50% and very particularly not more than 20%, after heat treatment at 375° C. for 20 minutes.

According to a third aspect, a subject matter of the invention is a dispersion of use in the preparation of a semifinished product comprising a PAEK-based resin and reinforcing fibers, comprising:
a. 1% to 50% by weight of PAEK-based resin exhibiting a Dv50 diameter of between 1 and 300 μm;
b. 0.001% to 5% by weight, calculated with respect to the weight of the resin, of at least one thermally stable surfactant;
c. 0%-1% by weight of other additives; and
d. the remainder water.

Finally, according to a fourth aspect, a subject matter of the invention is the use of a semifinished product as described above in the manufacture of composites.

In the processes for the manufacture of the composite parts, the semifinished products are subjected to different thermal cycles, under pressure or under vacuum, in order to assemble them together in order to form the composite part and/or to shape it.

DESCRIPTION OF THE EMBODIMENTS

Definition of the Terms

The term "semifinished product" is intended to denote products comprising a resin and reinforcing fibers used as intermediate products in the manufacture of composite materials. These products can in particular be prepregs in the form of unidirectional sheets, of rovings or of wovens, or else fiber/matrix mixtures.

The semifinished products can subsequently be assembled, for example by manual or automated drape forming or by automated fiber placement, and shaped by consolidation, for the manufacture of composite parts. The composite parts thus manufactured can be further converted, in order to obtain assemblages of complex composite parts. Thus, it is possible to coconsolidate composite parts, a process generally carried out in an autoclave by means of a fresh thermal cycle, or to come to weld parts to one another by local heating.

The term "resin" is intended to denote a composition predominantly comprising one or more polymers additivated, if appropriate, with conventional additives, in particular fillers and functional additives.

The term "dispersion" is intended to denote a heterogeneous composition comprising a liquid phase and a solid phase. In the dispersion employed in the process of the invention, the liquid phase is aqueous and contains a thermally stable surfactant and also other additives, if appropriate. The solid phase comprises or is essentially composed of the PAEK resin in the pulverulent form.

The term "surfactant" is intended to denote a compound exhibiting a hydrophilic part and a lipophilic part, and capable of dispersing the resin powder in the liquid phase and of keeping it in suspension in the presence or in the absence of stirring. This compound can also help in the wetting of the fibers by the dispersion.

A "thermally stable surfactant" is understood to mean a surfactant which does not generate, when it is subjected to temperatures of 375° C. for at least 20 min, reactive entities capable of significantly reacting with the PAEK resin.

This property is evaluated by the following test: The PAEK resin in the powder form (volume median diameter Dv50=20 μm) is introduced into an aqueous solution containing 1% by weight, with respect to the amount of resin, of the surfactant to be evaluated (resin content of the dispersion: 1% by weight). The mixture obtained is stirred for 30 minutes using a magnetic stirrer. The water is subsequently evaporated in an oven at 90° C. for 48 h. A dry residue of PAEK resin additivated with surfactant is obtained. Subsequently, a sample of the PAEK resin additivated with surfactant is subjected to a heat treatment at a temperature of 375° C. for a duration of 20 minutes while flushing with nitrogen.

It has proved problematic to measure the viscosity of these samples. Consequently, the viscosity of the PAEK resin additivated with surfactant was evaluated by means of the distribution of the molecular weights, which distribution is measured by size exclusion chromatographic analysis, according to the following protocol.

Approximately 30 mg of PAEK resin additivated with surfactant to be evaluated are introduced into 1 ml of 4-chlorophenol and stirred at 150° C. for 24 h. After cooling the solution to ambient temperature, 14 ml of hexafluoroisopropanol (HFIP) are added and then the solution is filtered through a syringe filter of Acrodisc type comprising a polytetrafluoroethylene (PTFE) membrane with a diameter of 25 mm and with a porosity of 0.2 μm.

The molecular weights of the resin are determined by size exclusion chromatography by means of an instrument of Waters Alliance 2695 type using the conditions below:

Flow rate: 1.00 ml/min. Eluent: HFIP. Volume injected: 100.00 Set of PSS PFG (1000+100 Å) 2*30 cm columns. Temperature 40° C. Detection method: differential refractometer. Calibration: PMMA with a range of molecular weights from 402 g/mol to 1 900 000 g/mol to be updated during each analytical series.

The content of solubles is measured by the ratio between the areas of the chromatograms of the sample analyzed, on the one hand, and of a soluble reference compound, on the other hand, prepared at the same concentration and injected in the same amount into the chromatography device.

When the weight-average molecular weight $M_w$ of the PAEK resin increases by more than 20%, with respect to the resin before the heat treatment, the surfactant studied is categorized as thermally unstable. Conversely, when the weight-average molecular weight $M_w$ of the PAEK resin increases by 20% or less, the surfactant studied is categorized as thermally stable.

A "thermally stable size" is understood to mean a size which does not generate, when it is subjected to temperatures of 375'C for at least 20 min, reactive entities capable of significantly reacting with the PAEK resin.

This property is evaluated by the following test: An intimate mixture of 72% by weight of PAEK resin (Dv50=20 μm) and 28% by weight of sized fibers to be evaluated is prepared in a mortar. Subsequently, a sample of this mixture of PAEK resin and of sized fibers is introduced into a plate/plate rheometer heated to 375'C and the change in the viscosity over 20 min is measured. When the viscosity of the mixture increases by more than 20%, the size is categorized as thermally unstable. Conversely, when the viscosity of the mixture increases by 20% or less, the size studied is categorized as thermally stable.

The Dispersion

The dispersion employed in the process provided comprises, according to the invention, an aqueous phase comprising the PAEK resin in the powder form and also at least one thermally stable surfactant.

The PAEK resin essentially comprises at least one poly (aryl ether ketone) (PAEK). Poly(aryl ether ketone)s (PAEKs) comprise the units of following formulae:

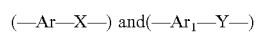

in which:

Ar and $Ar_1$ each denote a divalent aromatic radical;

Ar and $Ar_1$ can be chosen, preferably, from 1,3-phenylene, 1,4-phenylene, 4,4'-biphenylene, 1,4-naphthylene, 1,5-naphthylene and 2,6-naphthylene, which are optionally substituted;

X denotes an electron-withdrawing group; it can be chosen, preferably, from the carbonyl group and the sulfonyl group;

Y denotes a group chosen from an oxygen atom, a sulfur atom or an alkylene group, such as —$CH_2$— and isopropylidene.

In these X and Y units, at least 50%, preferably at least 70% and more particularly at least 80% of the X groups are a carbonyl group, and at least 50%, preferably at least 70% and more particularly at least 80% of the Y groups represent an oxygen atom. According to a preferred embodiment, 100% of the X groups denote a carbonyl group and 100% of the Y groups represent an oxygen atom.

More preferably, the poly(arylene ether ketone) (PAEK) can be chosen from:

a poly(ether ketone ketone), also called PEKK, comprising units of formula I A, of formula I B, and their mixture:

Formula IA

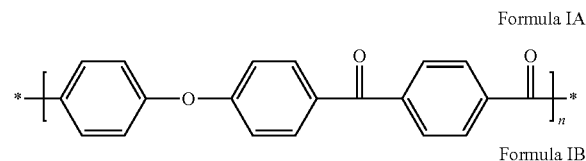

Formula IB

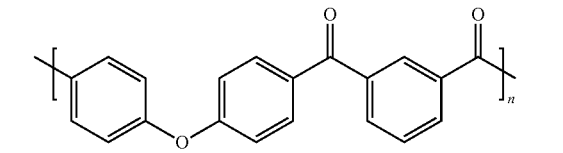

un poly(ether ether ketone), also called PEEK, comprising units of formula II:

Formula II

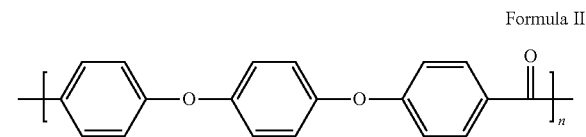

The sequences can be completely para (Formula II). In the same way, it is possible to partially or completely introduce meta sequences into these structures at the ethers and the ketones, according to the two examples of the formulae III and IV below:

Formula III

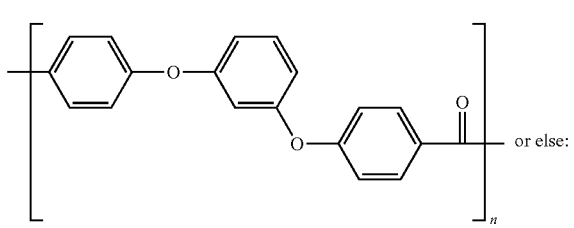

or else:

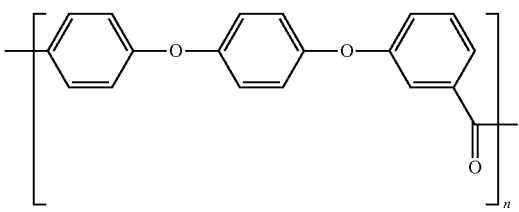

or ortho sequences according to the formula V:

Formula V

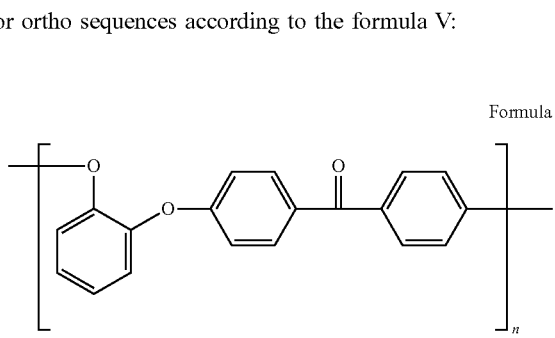

a poly(ether ketone), also called PEK, comprising units of formula VI:

Formula VI

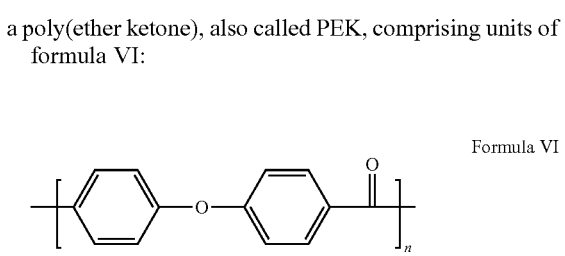

In the same way, the sequence can be completely para but it is possible to also partially or completely introduce meta sequences (formulae VII and VIII):

Formula VII

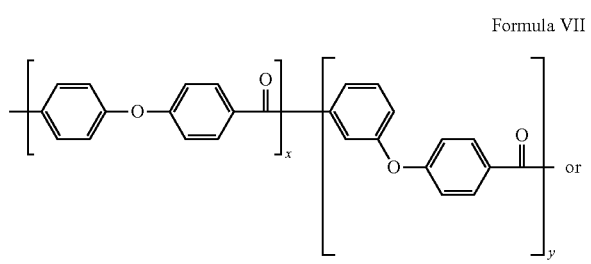

or

Formula VIII

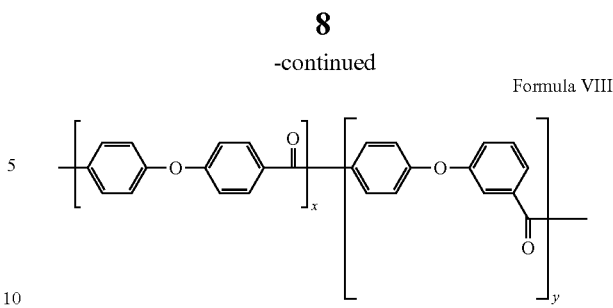

a poly(ether ether ketone ketone), also called PEEKK, comprising units of formula IX:

Formula IX

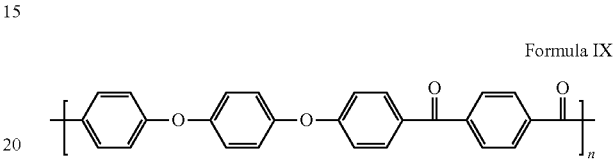

In the same way, it is possible to introduce meta sequences into these structures at the ethers and the ketones.

a poly(ether ether ether ketone), also called PEEEK, comprising units of formula X:

Formula X

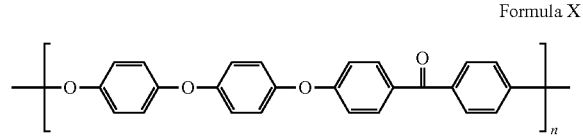

In the same way, it is possible to introduce meta sequences into these structures at the ethers and the ketones but also biphenol or diphenyl sequences according to the formula XI (units of D type in the next names; the formula XI thus corresponds to the name PEDEK):

Formula XI

Other arrangements of the carbonyl group and of the oxygen atom are also possible.

Preferably, the PAEKs used in the invention are chosen from the group consisting of poly(ether ketone) (PEK), poly(ether ether ketone) (PEEK), poly(ether ether ketone ketone) (PEEKK), poly(ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), their mixtures and their copolymers with one another or with other members of the family of the PAEKs. PEEK and PEKK and also their mixtures are particularly preferred.

Advantageously, the stability of the PAEK in the molten state can be improved by addition of one or more phosphates or phosphate salts.

Preferably, the PAEK resin comprises at least one poly (ether ketone ketone) (PEKK) which represents more than 50%, preferably more than 60%, in particular more than 70%, still preferred more than 80% and in particular more than 90% by weight of the resin, limit included. The remaining 10% to 50% by weight can consist of other polymers belonging or not belonging to the family of the PAEKs.

More preferably, the PAEK resin essentially consists of PEKK.

Advantageously, the PEKK exhibits a percentage by weight of terephthalic units, with respect to the sum of the terephthalic and isophthalic units, of between 35% and 100%, especially between 50% and 90% in particular between 55% and 85% and preferably between 60% and 80%, and very particularly this ratio is from 65% to 75%.

The resin can furthermore, as discussed above, additionally comprise other normal additives, such as fillers. Furthermore, the resin can optionally comprise minor amounts of functional additives. Preferably, the resin is nevertheless devoid of additives liable to decompose under the effect of heat, in order to limit the risk of change in the viscosity. More preferably still, the resin is devoid of functional additives.

The particle size of the PAEK resin powder can have an impact on the stability of the suspension. It can also influence the quality of impregnation with resin of the reinforcing fibers. In order to ensure the optimal homogeneity of the suspension and good impregnation, it is preferred for the resin powder to be finely divided. More specifically, it is preferred for the PAEK powder to exhibit a median diameter Dv50 is located in a range from 1 to 300 µm, preferably from 5 to 100 µm and very particularly from 10 to 50 µm, as measured according to the standard ISO 13 320.

Preferably, the content of PAEK resin powder of the dispersion is advantageously between 0.1% and 50%, preferably between 1% and 40% and still preferred between 10% and 30% by weight, with respect to the weight of the finished dispersion.

As touched on above, the process according to the invention is characterized by the fact that the dispersion furthermore comprises at least one thermally stable surfactant. This is because the studies carried out have made it possible to demonstrate that the surfactant was the main factor in the increase in the viscosity of the PAEK resin present in a semifinished product, which increase is observed subsequent to the thermal cycle required for its consolidation.

The test described above makes it possible to evaluate a surfactant with regard to its ability to withstand the temperatures required without forming reactive entities capable of significantly reacting with the PAEK resins. It is thus possible to determine, simply and rapidly, if a surfactant is thermally stable within the meaning of the present invention.

It is possible to choose, as thermally stable surfactant, an ionic or nonionic surfactant. Preferably, it is an ionic surfactant and in particular an anionic surfactant.

Preferably, the thermally stable surfactant is a surfactant comprising at least one aromatic entity, in particular one or more phenyl groups.

According to a particularly preferred embodiment, the thermally stable surfactant comprises a phosphoric acid, phosphate or sulfonate group. Moreover, the phosphates and sulfonates appear less inclined to react with the PAEK resins than other surfactants when they are used in the process for impregnation by aqueous dispersion.

More specifically, mention may in particular be made of the surfactants of the family of the phosphoric acid esters. Preferably, they are phosphoric acid monoesters or diesters. They can in particular be esters of phosphoric acid with alcohols, in particular alcohols comprising from 6 to 24 and especially from 10 to 16 carbon atoms. Alkyl ether acids, phosphates or sulfonates and alkylaryl ether phosphates or sulfonates are particularly preferred. Advantageously, they are phosphates of alkoxylated alcohols, in particular methoxylated, ethoxylated or propoxylated alcohols. The number of alkoxyl molecules per phosphate group can vary widely and can in particular be between 1 and 100, preferably between 2 and 50 and very particularly between 10 and 20.

Mention may in particular be made, as compounds of this family, of the surfactants of the family of the alkyl ether phosphoric acids sold under the name of Lanphos PE35 by Lankem, Ceca base RT by Ceca France and Klearfac AA270 by DeWolf.

These surfactants can be used in the free acid form but it is preferably neutralized. The neutralization can be carried out beforehand or in situ in the dispersion by addition of an appropriate amount of sodium hydroxide or potassium hydroxide.

The dispersion preferably comprises not more than the minimum content of surfactant required to appropriately stabilize the suspension. This content depends on factors such as the particle size of the PAEK resin, the amount of particles to be dispersed and the nature of the surfactant.

It can be advantageous to add several thermally stable surfactants. In particular, it is possible to choose a thermally stable surfactant which makes it possible to ensure good dispersion of the PAEK resin powder and another thermally stable surfactant in order to improve the affinity of the reinforcing fibers with the PAEK resin powder.

Nevertheless, generally, a content of surfactant of 0.001% to 5% by weight, preferably of 0.01% to 2% and very particularly of 0.1% to 1%, and in particular of 0.2% to 0.8%, by weight, with respect to the weight of resin, makes it possible to ensure the stability of the suspension and good wetting of the fibers.

The aqueous phase of the dispersion can, if necessary, comprise minor amounts of other conventional additives, such as thickening agents, anti-foaming agents or biocidal agents. In order to limit the presence of additives in the semifinished products and the associated potential problems, the dispersion nevertheless comprises a preferably minimal content of other additives. Preferably, the amount of other additives will not exceed 1% by weight and in particular will not exceed 0.5% by weight of the finished dispersion.

In order to facilitate the wetting of the fibers, the dispersion advantageously exhibits a viscosity of less than 10 Pa·s, advantageously of less than 5, and in particular of between 0.0001 and 1, and preferably of between 0.001 and 0.1 Pa·s at 20° C.

Preferably, the additives present in the dispersion will be thermally stable, as determined by the test described above. Nevertheless, it is preferred for the aqueous phase of the dispersion to comprise a minimum of additives and in particular to comprise only the thermally stable surfactant.

The water used to prepare the dispersion is preferably a demineralized water.

The process for the preparation of the dispersion can be carried out in a way known per se. More specifically, it is possible to prepare the dispersion by introducing, into a vessel of appropriate volume provided with an appropriate stirring device, the required amount of water and by then subsequently adding the surfactant and also the other additive or additives, if appropriate. If necessary, the mixture is stirred until a homogeneous solution is obtained. The pulverulent PAEK resin is subsequently introduced into the aqueous solution and then stirring is carried out until a stable dispersion is obtained.

The Reinforcing Fibers

The reinforcing fibers can in principle be any fibers habitually used in the manufacture of semifinished products.

In accordance with the invention, the reinforcing fibers can be chosen from all fibers capable of being used as reinforcement in the manufacture of parts made of composite materials.

Thus, they can in particular be glass fibers, quartz fibers, carbon fibers, graphite fibers, silica fibers, metal fibers, such as steel fibers, aluminum fibers or boron fibers, ceramic fibers, such as silicon carbide or boron carbide fibers, synthetic organic fibers, such as aramid fibers or poly(p-phenylene benzobisoxazole) fibers, better known under the abbreviation PBO, or else PAEK fibers, or else mixtures of such fibers.

Preferably, they are carbon fibers or glass fibers, and more particularly carbon fibers.

According to a preferred embodiment, the fibers do not bring about, in combination with the other compounds, a significant change in the viscosity of the PAEK in the semifinished product and in the composite.

The fibers are preferably nonsized. If they are sized, they are preferably sized by a thermally stable size as defined above.

The reinforcing fibers used in the manufacture of semi-finished products by impregnation by the aqueous dispersion route are generally continuous.

Preferably, they are provided in the form of unidirectional fibers, for example in the form of threads bringing together several thousand individual filaments (typically from 3000 to 48 000), measuring, for example, from 6 to 10 μm in diameter for the carbon fibers. Fibers of this type are known under the name of roving.

Nevertheless, the fibers can also be arranged in a different way, for example in the mat form, or else in the form of textiles obtained by weaving of rovings.

The Process for the Manufacture of the Semifinished Products

The manufacturing process according to the invention can be carried out conventionally, on the usual equipment, by employing the dispersion as described above. As indicated above, the presence in the dispersion of a thermally stable surfactant makes it possible to limit the formation of reactive entities capable of increasing the molecular weight of the resin and hence its viscosity, and by this means to reduce the appearance of defects in the composite parts.

More specifically, the semifinished products are obtained by introduction of the reinforcing fibers into and circulation of the reinforcing fibers in a bath of aqueous dispersion as described above. The fibers impregnated with PAEK resin are subsequently removed from the bath and freed of the water, for example by drying in an infrared oven. The dried impregnated fibers are subsequently heated until the resin has melted, in order to make possible the coating of the fibers by the PAEK resin. The coated fibers obtained are subsequently, if appropriate, shaped, for example by calendering, in order to shape and give proportions to the semifinished product.

Preferably, the semifinished products according to the invention comprise from 1% to 99% by weight, preferably from 30% to 90% by weight, in particular from 50% to 80% by weight and in particular from 60% to 70% by weight of reinforcing fibers.

The semifinished products manufactured according to the process of the invention are characterized in particular by a resin, the viscosity of which has changed little despite the high temperatures required for their manufacture in order to melt the resin.

The semifinished products obtained according to the process of the invention can be used in particular in the manufacture of composite parts.

The composite parts are obtained, for example, by manufacturing first a preform, in particular by placing or drape forming the pre-impregnated semifinished products in a mold. The composite part is subsequently obtained by consolidation, during which stage the preform is heated and compressed, for example in an autoclave or in a press, so as to assemble the semifinished products by melting.

The composite products manufactured according to the process of the invention are characterized in particular by a resin, the viscosity of which has changed little despite the high temperatures required for their manufacture.

During these stages, a not excessively high viscosity of the matrix is essential in order to ensure that the semifinished products indeed match the shapes of the mold. The viscosity of the matrix also makes it possible to ensure a good flow during the consolidation and to thus prevent the surface defects, such as creasings.

The invention will be explained in more detail in the examples which follow.

EXAMPLES

Examples 1 to 3: Change in the Viscosity According to the Process for the Manufacture of the Semifinished Product The impact of the thermal cycle on the change in the viscosity was studied for a PEKK resin (Kepstan 7003, sold by Arkema France) and for semifinished products manufactured from this resin and carbon fibers according to different methods.

The prepregs were manufactured on the laboratory scale with 70% by weight of Kepstan 7003 resin and 30% by weight of carbon fibers, on the one hand according to a molten route process and, on the other hand, by the dispersion route, according to the following respective protocols:

1) Method of Impregnation by the Molten Route:

Approximately 8 g of carbon fiber rovings (12K fiber having an epoxy E13 compatible size sold under the name of HTA40 by Toho-Tenax) are positioned on a polyimide sheet (Upilex film with a thickness of 50 μm sold by Ube) using a temperature-resistant aluminum adhesive.

The carbon fiber rovings are subsequently homogeneously dusted with 20 g of PEKK powder (sold under the name of Kepstan 7003 by Arkema France, Dv50=300 μm) using a vibrating sieve. The PEKK powder surface is subsequently covered with a second polyimide sheet.

The assemblage is subsequently placed between two steel sheets and is passed under a Carver press at 375'C for 1 minute under 5 bar. The assemblage is subsequently removed from the press and allowed to cool to ambient temperature.

After peeling off the polyimide sheets and cutting off the aluminum adhesives, a prepreg prepared by the molten route is obtained. The prepreg obtained is divided into two parts.

2) Method of Impregnation by Aqueous Dispersion:

An aqueous surfactant solution is prepared by introduction, into a flask, of 1000 g of water and also of 0.1 g of Triton™ X100 (t-octylphenoxypolyethoxyethanol) surfactant sold by Dow. The aqueous solution is homogenized for 10 minutes using a magnetic stirrer.

4 g of sized carbon fibers (HTA40 E13, sold by Toho-Tenax) cut to a length of 1 cm are subsequently gradually introduced into the flask containing the aqueous solution with vigorous stirring with a homogenizer of Ultra-Turrax type. The dispersion obtained is finally homogenized for 10 minutes. At the end of this stage, the carbon fibers were homogeneously ground and are in suspension in the aqueous solution.

Subsequently, 10 g of PEKK powder (sold under the name of Kepstan 7003 by Arkema France, Dv50=20 µm) are added and the mixture obtained is stirred for 30 minutes using a magnetic stirrer.

The water is subsequently evaporated in an oven at 90° C. for 48 h.

A homogeneous mixture of PEKK powder additivated with surfactant and with carbon fibers is thus obtained. A prepreg is then produced by compression at 375° C. under 5 bar for 1 minute as described above.

The two prepregs respectively produced by the molten route and by the aqueous dispersion route are subsequently subjected to a thermal cycle reproducing that required for the consolidation of the semifinished products. The thermal cycle consists of a passage in an oven at 375° C. for 20 minutes while flushing with nitrogen.

The weight-average molecular weight $M_W$ of the PEKK resin is subsequently measured by size exclusion chromatography, according to the protocol below, for:
  the unconverted PEKK resin (example 1)
  the sample obtained by the molten route (example 2) and
  the sample brought into contact with a surfactant as in a process for impregnation by the aqueous dispersion route (example 3).

For examples 2 and 3, the measurement is carried out for the sample before and after the thermal cycle.

Approximately 30 mg of the sample are introduced into 1 ml of 4-chlorophenol and stirred at 150° C. for 24 h. After cooling the solution to ambient temperature, 14 ml of hexafluoroisopropanol (HFIP) are added and then the solution is filtered through a syringe filter of Acrodisc type comprising a polytetrafluoroethylene (PTFE) membrane with a diameter of 25 mm and with a porosity of 0.2 µm.

The molecular weights of the resin in the sample are determined by size exclusion chromatography by means of an instrument of Waters Alliance 2695 type using the conditions below:

Flow rate: 1.00 ml/min. Eluent: HFIP. Volume injected: 100.00 Set of PSS PFG (1000+100 Å) 2*30 cm columns. Temperature 40° C. Detection method: differential refractometer. Calibration: PMMA with a range of molecular weights from 402 g/mol to 1 900 000 g/mol to be updated during each analytical series.

The content of solubles is measured by the ratio between the areas of the chromatograms of the sample analyzed, on the one hand, and of a soluble reference compound prepared at the same concentration and injected in the same amount into the chromatography device, on the other hand. The content of insolubles then consists of the content of carbon fibers and of the content of insoluble polymer. Care will then be taken to subtract the content of carbon fibers in order to obtain only the content of insoluble polymer.

The results are collated in Table 1 below.

The results in table 1 demonstrate that the change in the weight-average molecular weight $M_w$ of the resin in the sample containing a surfactant as necessary in the dispersion route is more than twice that in a semifinished product manufactured by the molten route.

Furthermore, in example 3, carried out by the dispersion route, a significant increase in the fraction of insolubles is noticed, a sign that a portion of the polymer is modified to the point that it can no longer be dissolved under the experimental conditions.

TABLE 1

Change in the weight-average molecular weight $M_w$ of the PEKK resin

| | | before thermal cycle | | after thermal cycle | | Change with |
|---|---|---|---|---|---|---|
| Ex. | Material | $M_w$ (g/mol) | Insolubles (%) | $M_w$ (g/mol) | Insolubles (%) | regard to $M_w$ (%) |
| 1 | PEKK resin (Kepstan 7003) (reference) | 54 000 | — | 58 000 | — | 7.5% |
| 2 | Sample obtained by the molten route | 54 000 | — | 69 000 | <5% | 28% |
| 3 | Sample obtained by the dispersion route | 59 000 | — | >100 000 | 15% | >100% |

Examples 4 to 12: Change in the Viscosity According to the Nature of the Carbon Fibers The impact of the thermal cycle on the change in viscosity was studied for samples containing carbon fibers originating from different manufacturers and sized or nonsized. The fibers used here are as follows:

HexTow AS4 fiber, sold by Hexcel (nonsized),

HexTow AS4D fiber, sold by Hexcel (nonsized),

Tenax HTS45 P12 fiber, sold by Toho-Tenax (with thermoplastic compatible size),

Tenax HTA40 E13 fiber, sold by Toho-Tenax (with epoxy compatible size).

Mixtures of PEKK resin and of these carbon fibers were manufactured according to the following protocol:

An amount of 2 g of PEKK resin powder (Kepstan 7002, sold by Arkema France, Dv50=20 µm) is introduced into a mortar. An amount of 14%, 28% and 43% by weight, with respect to the total weight of the sample, of fibers cut to a length of 0.5 cm is added.

Mechanical mixing is carried out in the mortar in the presence of a few drops of water, which make it possible to help in the wettability and in the good dispersing of the fibers in the resin. The mixtures thus produced are subsequently dried under vacuum at 120° C. for 12 hours. The viscosity is subsequently measured, for each sample, in a plate/plate rheometer under nitrogen (1 Hz) at 375'C as a function of the time for 20 minutes. The change in the viscosity (in %) under the effect of the thermal cycle reproducing that required for the consolidation of the semi-finished products can be evaluated by comparing the viscosity value measured at the starting moment and after testing for 20 minutes.

The results for the different mixtures produced are collated in table 2 below and in the single figure.

TABLE 2

Composition of the examples and change in the viscosity

| Ex. | PEKK resin [% by weight] | AS4 fibers [% by weight] | AS4D fibers [% by weight] | HTS45 P12 fibers [% by weight] | HTA40 E13 fibers [% by weight] | Change in the viscosity (%) |
|---|---|---|---|---|---|---|
| 4  | 100% |     |     |     |     | 0%   |
| 5  | 72%  | 28% |     |     |     | 16%  |
| 6  | 57%  | 43% |     |     |     | 3%   |
| 7  | 72%  |     | 28% |     |     | 12%  |
| 8  | 57%  |     | 43% |     |     | 14%  |
| 9  | 86%  |     |     | 14% |     | 27%  |
| 10 | 72%  |     |     | 28% |     | 33%  |
| 11 | 86%  |     |     |     | 14% | 21%  |
| 12 | 72%  |     |     |     | 28% | 110% |

The results in table 2 and the single figure demonstrate that the presence of carbon fibers has a significant effect on the change in the viscosity of the PAEK resin. Furthermore, it is noted that this effect is highly variable according to the nature of the fibers employed. In particular, it is found that the nonsized fibers have a reduced effect in comparison with the sized fibers. Finally, it is noted, among the sized fibers, that some sizes can have a very harmful effect on the viscosity of the PAEK resin.

Consequently, the connection between the increase in the viscosity and the presence of exogenous entities, after heat treatment, can be deduced from this study. Furthermore, it is concluded that there is an advantage in preferably using nonsized fibers.

Examples 13-21: Evaluation of the Thermal Stability of Surfactants

The impact of the thermal cycle on the change in the weight-average molecular weight $M_w$ was studied for a PEKK resin (Kepstan 7002, sold by Arkema France) for different surfactants.

The samples were manufactured according to the following protocol:

An aqueous surfactant solution is prepared by introduction, into a flask, of 1000 g of water and also of 0.1 g of a surfactant. The aqueous solution is homogenized for 10 minutes using a magnetic stirrer. Subsequently, 10 g of PEKK powder (sold under the name of Kepstan 7002 by Arkema France, Dv50=20 μm) are added and the mixture obtained is stirred for 30 minutes using a magnetic stirrer. The water is subsequently evaporated in an oven at 90'C for 48 h. A homogeneous mixture of PEKK powder additivated with surfactant is thus obtained.

The different examples are prepared with the surfactants indicated below.

The surfactant Cremophor® A25 (ethoxylated $C_{16}$-$C_{18}$ alcohol), sold by BASF.

The surfactant Brij® S 100 (ethoxylated stearyl alcohol), sold by Sigma-Aldrich.

The surfactant Lanphos PE35 (isotridecyl alcohol ethoxylate phosphate ester), sold by Lankem, used here in the form neutralized by sodium hydroxide denoted as "Lanphos PE35Na".

The surfactant Agrosurf DIS145 (condensate of sodium naphthalenesulfonate and of formaldehyde), sold by Lankem.

The surfactant Triton™ X100 (t-octylphenoxypolyethoxyethanol), sold by Dow.

The surfactant Triton™ GR-7ME (dioctyl sulfosuccinate dissolved in aromatic hydrocarbon), sold by Dow.

A portion of the samples prepared is used to measure the weight-average molecular weight $M_w$ of the PEKK resin before and after thermal cycle, as described in example 3. The results are collated in Table 3 below.

TABLE 3

Weight-average molecular weight $M_w$ of PEKK resin containing different surfactants

| | | Before thermal cycle | | After thermal cycle | | |
|---|---|---|---|---|---|---|
| Ex. | Material | $M_w$ [g/mol] | Insolubles (%) | $M_w$ [g/mol] | Insolubles (%) | Change [%] |
| 13 | PEKK resin alone (reference) | 65 000 | — | 68 000 | — | 5% |
| 14 | PEKK resin with 1% of Cremophor ® A25 surfactant | 65 000 | — | 87 000 | <5% | 22% |
| 15 | PEKK resin with 1% of Brij ® S 100 surfactant | 65 000 | — | 84 000 | <5% | 25% |
| 16 | PEKK resin with 1% of Lanphos PE35Na surfactant | 65 000 | — | 72 000 | <5% | 10% |
| 17 | PEKK resin with 1% of Agrosurf DIS145 surfactant | 65 000 | — | 69 000 | <5% | 5% |
| 18 | PEKK resin with 1% of Triton ™ X100 surfactant | 65 000 | — | >100 000 | >5% | 70% |
| 19 | PEKK resin with 1% of Triton ™ GR-7ME surfactant | 65 000 | — | 91 000 | <5% | 40% |

The results in table 3 above demonstrate a marked effect of the choice of the surfactant on the change in the viscosity of the PAEK resin.

In particular, it is noted that the surfactants Lanphos PE35Na and Agrosurf DIS145 are thermally stable with the PEKK under the test conditions, since the weight-average molecular weight $M_w$ of the resin increases by less than 20% after a thermal cycle of 20 min at 375'C.

On the other hand, the surfactants Cremophor® A25, Brij® S 100, Triton™ GR-7ME and Triton™ X100 tested do not satisfy this test since the weight-average molecular weight $M_w$ of the resin increases by 30%, indeed even by up to 70%.

Thus, the change in the weight-average molecular weight $M_w$ of example 18 carried out with the surfactant Triton™ X100 is very significantly greater than that measured on the samples of examples 16 and 17 respectively carried out using the surfactants PE35Na and DIS145.

The facts given above show that the nature of the surfactant constitutes a significant factor in controlling the change in the viscosity and in the weight-average molecular weight $M_w$ of a PAEK resin subjected to a thermal cycle representative of that required for the consolidation of a semifinished product to give composite parts.

Examples 20-22: Change in the Viscosity According to the Surfactant

The impact of the thermal cycle on the change in the weight-average molecular weight $M_w$ was studied for a PEKK resin (Kepstan 7002, sold by Arkema France) with different surfactants, in the presence of nonsized AS4D carbon fibers sold by Hexcel.

The samples were manufactured according to the protocol of example 3 above, with the surfactants indicated below.

The surfactant Cremophor® A25, sold by BASF.

The surfactant Lanphos PE35Na, sold by Lankem.

A portion of the samples prepared is subjected to a thermal cycle and the weight-average molecular weight $M_w$ of the PEKK resin of the samples is measured before and after thermal cycle, as described in example 3.

The results are collated in Table 4 below.

TABLE 4

Weight-average molecular weight $M_w$ of PEKK resin containing different surfactants

| | | Before thermal cycle | | After thermal cycle | | |
|---|---|---|---|---|---|---|
| Ex. | Material | $M_w$ [g/mol] | Insolubles (%) | $M_w$ [g/mol] | Insolubles (%) | Change [%] |
| 20 | PEKK resin alone (reference) | 65 000 | — | 68 000 | — | 5% |
| 21 | PEKK resin with 30% of AS4D fibers and 1% of Cremophor® A25 surfactant | 65 000 | — | 87 000 | <5% | 30% |
| 22 | PEKK resin with 30% of AS4D fibers and 1% of PE35Na surfactant | 65 000 | — | 75 000 | <5% | 15% |

The results in table 4 demonstrate a marked effect of the choice of the surfactant on the change in the viscosity of the PAEK resin.

This is because the surfactant PE35Na is more stable with the PEKK under the test conditions than the surfactant Cremophor® A25. The change in the weight-average molecular weight $M_w$ of example 21 carried out with the surfactant Cremophor® A25 is very significantly greater than that measured on the sample of example 22 carried out using the surfactant PE35Na.

Furthermore, a significant fraction of insolubles is noted in the sample, reflecting the presence of polymer which cannot be dissolved by the experimental protocol.

It is found, from all of the studies given above, that the nature of the surfactant constitutes an essential factor concerning the change in the viscosity and in the weight-average molecular weight $M_w$ of a PAEK resin subjected to a thermal cycle representative of that required for the consolidation of a semifinished product to give composite parts.

Nevertheless, this effect can be substantially alleviated by an appropriate choice of the surfactant. In particular, the use of a surfactant which is thermally stable at the melting points of the PAEK polymers makes it possible to limit the formation of reactive entities.

Furthermore, the choice of appropriate reinforcing fibers, sized or nonsized, also makes it possible to reduce the increase in the viscosity.

The use of a thermally stable surfactant during the manufacture of semifinished products according to the process of the invention thus makes it possible, while preserving the viscosity of the PAEK resin, to ensure a good quality of the composite parts obtained from the semifinished products.

Lists of the Documents Cited

WO 88/03468
U.S. Pat. No. 5,236,972
U.S. Pat. No. 5,888,580
FR 3 034 425

EMBODIMENTS

1. A process for the preparation of a semifinished product comprising a PAEK-based resin and reinforcing fibers, comprising the stages of:
   a. preparation of a dispersion comprising a PAEK-based resin in the pulverulent form dispersed in an aqueous phase comprising at least one surfactant;
   b. bringing the reinforcing fibers into contact with said aqueous dispersion;
   c. drying the fibers impregnated with dispersion; and
   d. heating the impregnated fibers to a temperature sufficient for the melting of the resin, so as to form a semifinished product, characterized in that the surfactant is a thermally stable surfactant.
2. The preparation process as in embodiment 1, in which the surfactant comprises aromatic groups.
3. The preparation process as in either of embodiments 1 and 2, in which the surfactant comprises a phosphoric acid, phosphate or sulfonate group.
4. The preparation process as in one of embodiments 1 to 3, in which the reinforcing fibers are carbon fibers.
5. The preparation process as in one of embodiments 1 to 4, in which the reinforcing fibers are nonsized fibers.
6. The preparation process as in one of embodiments 1 to 5, in which the reinforcing fibers are fibers sized with a thermally stable size.
7. The preparation process as in one of embodiments 1 to 6, in which the PAEK resin is chosen from the group consisting of poly(ether ketone) (PEK), poly(ether ether ketone) (PEEK), poly(ether ether ketone ketone) (PEEKK), poly(ether ether ketone ketone) (PEKK), poly(ether ketone ether ketone ketone) (PEKEKK), poly(ether ether ketone ether ketone) (PEEKEK), poly (ether ether ether ketone) (PEEEK) and poly(ether diphenyl ether ketone) (PEDEK), their mixtures and their copolymers with one another or with other members of the family of the PAEKs.
8. The preparation process as in one of embodiments 1 to 7, in which the PAEK resin is a PEKK exhibiting a percentage by weight of terephthalic units, with respect to the sum of the terephthalic and isophthalic units, of between 35% and 100%, in particular between 50% and 90% and especially between 55% and 85%.
9. The preparation process as in one of embodiments 1 to 8, in which the pulverulent PAEK resin in the dispersion exhibits a volume median diameter Dv50, as measured according to the standard ISO 13 320, of 1 to 300 µm, preferably of 5 to 100 µm and very particularly of 10 to 50 µm.
10. The preparation process as in one of embodiments 1 to 9, in which the semifinished product is chosen from a prepreg or a tape.
11. A dispersion of use in the preparation of a semifinished product comprising a PAEK-based resin and reinforcing fibers, comprising:
  a. 1% and 50% by weight of PAEK-based resin exhibiting a Dv50 diameter, as measured according to the standard ISO 13 320, of between 1 and 300 µm;
  b. 0.001% to 5% by weight, calculated with respect to the weight of the resin, of at least one thermally stable surfactant;
  c. 0%-1% by weight of other additives; and
  d. the remainder water.
12. A semifinished product comprising a resin based on a PAEK and reinforcing fibers, capable of being obtained by the process as defined in the preceding embodiments.
13. The semifinished product as in embodiment 12, in which the weight-average molecular weight $M_w$ of the PAEK resin, as measured by size exclusion chromatographic analysis, does not increase by more than 100% after heat treatment at 375'C for 20 minutes.
14. The use of a semifinished product as in one of embodiments 12 to 14 in the manufacture of composite materials.

The invention claimed is:

1. A process for the preparation of a semifinished product comprising a poly(aryl ether ketone) (PAEK)-based resin and reinforcing fibers, comprising the stages of:
  a. preparation of a dispersion comprising the PAEK-based resin in pulverulent form dispersed in an aqueous phase comprising at least one surfactant and, if an additive is present, only additives selected from the group consisting of antifoaming agents and biocidal agents;
  b. bringing the reinforcing fibers into contact with said aqueous dispersion;
  c. drying the fibers impregnated with dispersion; and
  d. heating the impregnated fibers to a temperature sufficient for the melting of the resin, so as to form a semifinished product,
  wherein the surfactant is a thermally stable surfactant which does not increase the weight-average molecular weight of the PAEK-based resin, as measured by size exclusion chromatographic analysis, by more than 20% after the heating stage.

2. The preparation process as claimed in claim 1, in which the surfactant comprises aromatic groups.

3. The preparation process as claimed in claim 1, in which the surfactant comprises a phosphoric acid, phosphate or sulfonate group.

4. The preparation process as claimed in claim 1, in which the reinforcing fibers are carbon fibers.

5. The preparation process as claimed in claim 1, in which the reinforcing fibers are nonsized fibers.

6. The preparation process as claimed in claim 1, in which the reinforcing fibers are fibers sized with a thermally stable size.

7. The preparation process as claimed in claim 1, in which the PAEK resin is chosen from the group consisting of poly(ether ketone) (PEK), poly(ether ether ketone) (PEEK), poly(ether ether ketone ketone) (PEEKK), poly(ether ether ketone ketone) (PEKK), poly(ether ketone ether ketone ketone) (PEKEKK), poly(ether ether ketone ether ketone) (PEEKEK), poly(ether ether ether ketone) (PEEEK) and poly(ether diphenyl ether ketone) (PEDEK), their mixtures and their copolymers with one another or with other members of the family of the PAEKs.

8. The preparation process as claimed in claim 1, in which the PAEK resin is a PEKK exhibiting a percentage by weight of terephthalic units, with respect to the sum of the terephthalic and isophthalic units, of between 35% and 100%.

9. The preparation process as claimed in claim 1, in which the pulverulent PAEK resin in the dispersion exhibits a volume median diameter Dv50, as measured according to the standard ISO 13 320, of 1 to 300 µm.

10. The preparation process as claimed in claim 1, in which the semifinished product is chosen from a prepreg or a tape.

11. The preparation process as claimed in claim 1, in which the dispersion comprises:
  a. 1% to 50% by weight of the PAEK-based resin, the PAEK-based resin exhibiting a Dv50 diameter, as measured according to the standard ISO 13 320, of between 1 and 300 µm;
  b. 0.001% to 5% by weight, calculated with respect to the weight of the PAEK-based resin, of the at least one thermally stable surfactant;
  c. 0%-1% by weight of the additives; and
  d. the remainder water.

12. The preparation process as claimed in claim 1, wherein the dispersion possesses a viscosity of less than 10 Pa·s at 20° C., and the viscosity of the dispersion at 375° C. does not increase by more than 20% throughout the preparation process.

13. The preparation process as claimed in claim 1, wherein the PAEK-based resin exhibits a change in viscosity at 375° C. of less than 20% throughout the preparation process.

14. The preparation process as claimed in claim 1, in which the surfactant comprises a phosphoric, phosphate or sulfonate group and comprises aromatic groups; or in which the surfactant is chosen from phosphoric acid esters, alkyl ether phosphoric acids, alkyl ether phosphates, alkyl ether sulfonates, alkylaryl ether phosphates, or alkylaryl ether sulfonates.

15. The preparation process as claimed in claim 1, in which the surfactant comprises a phosphoric, phosphate or sulfonate group and comprises aromatic groups.

16. The preparation process as claimed in claim 1, in which the surfactant is chosen from phosphoric acid esters, alkyl ether phosphoric acids, alkyl ether phosphates, alkyl ether sulfonates, alkylaryl ether phosphates, or alkylaryl ether sulfonates.

* * * * *